United States Patent [19]

Takahashi et al.

[11] Patent Number: 4,839,799

[45] Date of Patent: Jun. 13, 1989

[54] BUFFER CONTROL METHOD FOR QUICKLY DETERMINING WHETHER A REQUIRED DATA BLOCK IS IN THE BUFFER

[75] Inventors: Masami Takahashi; Eiji Tatsukawa, both of Yokohama; Shunichi Torii, Musashino; Keiji Kojima, Kokubunji, all of Japan

[73] Assignees: Hitachi, Ltd.; Hitachi Computer Consultant, Ltd., both of Tokyo, Japan

[21] Appl. No.: 888,801

[22] Filed: Jul. 24, 1986

[30] Foreign Application Priority Data

Jul. 29, 1985 [JP]  Japan .................................. 60-167198
Jan. 9, 1986 [JP]  Japan .................................... 61-2773

[51] Int. Cl.⁴ ......................... G06F 12/06; G06F 7/22
[52] U.S. Cl. ..................................... 364/200; 364/300
[58] Field of Search ... 364/200 MS File, 900 MS File, 364/300

[56] References Cited

U.S. PATENT DOCUMENTS

4,497,039  1/1985  Kitakami et al. .................... 364/300
4,510,567  4/1985  Chang et al. ........................ 364/300
4,644,471  2/1987  Kojima et al. ...................... 364/300
4,716,524 12/1987  Oxley et al. ......................... 364/200

OTHER PUBLICATIONS

Knuth, *The Art of Computer Programming*, vol. 3, Sorting and Searching, Addison-Wesley, 1973.

King, III, "Relational Database Systems: Where We Stand Today", *Information Processing* 80, North-Holland, 1980.

*Primary Examiner*—Raulfe B. Zache
*Assistant Examiner*—Florin Munteanu
*Attorney, Agent, or Firm*—Antonelli, Terry & Wands

[57] ABSTRACT

In an information processing method and system including a secondary storage, a primary storage for storing data blocks of the secondary storage and a directory containing control information for the data blocks stored in the primary storage, the directory is consulted to determine whether a desired data block is in the primary storage, and if it is, the data block is read from the primary storage. The control information of the directory contains pairs of addresses on the primary storage of the data blocks stored in the primary storage and the addresses on the secondary storage.

8 Claims, 11 Drawing Sheets

| ITEM NO. | OPERATION (13) | INPUT | | | OUTPUT | | | |
|---|---|---|---|---|---|---|---|---|
| | | OP2 < OP3 OR OP3 END | OP2 = OP3 | OP2 > OP3 OR OP2 END | SELECTION (28) | OP2 UPDATE (23a) | OP3 UPDATE (23b) | OP1 UPDATE (23c) |
| #1 | DIFFERENCE | — | ○ | ○ | OP2 | — | ○ | — |
| #2 | DIFFERENCE | ○ | — | ○ | — | — | ○ | ○ |
| #3 | DIFFERENCE | ○ | ○ | — | — | ○ | — | ○ |
| #4 | UNION | — | — | ○ | OP2 | — | ○ | — |
| #5 | UNION | ○ | ○ | ○ | OP2 | — | ○ | — |
| #6 | UNION | — | ○ | — | OP3 | ○ | — | — |
| #7 | JOIN | ○ | — | ○ | — | — | ○ | ○ |
| #8 | JOIN | ○ | ○ | ○ | OP2 | ○ | — | — |
| #9 | JOIN | ○ | ○ | — | — | ○ | — | ○ |

FIG. 10

BUFFER CONTROL METHOD FOR QUICKLY DETERMINING WHETHER A REQUIRED DATA BLOCK IS IN THE BUFFER

BACKGROUND OF THE INVENTION

1. Field of the Invention

The present invention relates to a method for controlling access to data stored in a buffer memory, and more particularly to a method for controlling access to a buffer which is suitable in quickly determining whether a required data is stored in the buffer memory or not

2. Description of the Prior Art

In a system, such as a data base system which contains a large volume of data, and repeatedly reads out such data and processes them, high speed readout of the data is required.

In a relational data base system, a large volume of data is stored in an external storage, such as a magnetic disk device. Areas on the disk are divided into blocks which are called pages, and the data on the disk is read and transferred from the disk to a main storage for each data block. The transferred data block is stored in a buffer area in the main storage for utilization.

The relational data base system has been well known, for example, by "RELATIONAL DATA BASE SYSTEMS: WHERE WE STAND TODAY", papers of conference "INFORMATION PROCESSING 80", published by North-Holland Publishing Company.

A prior art method to control the data block transferred to the buffer area of the main storage is described below.

The transferred data block is written into the buffer area in accordance with a start address of the designated area in which the data block is to be written. The data block next transferred is also stored at the designated address. The address is stored in the previous buffer area as an address (pointer) for accessing the data block to be next connected. The data blocks transferred subsequently are stored in a similar manner. This method is called a chaining method. Start address of the chain is separately stored.

The chaining method may be one which chains in the order of transfer as described above or one which alters the chain so that a most recently referenced data block comes to the top position.

In processing data of the data base, if a necessary data is stored in the buffer area, it is utilized, and if it is not stored, the data block is fetched from the external storage and stored in the buffer area for utilization.

In a prior art control method, in order to determine whether the required data block is in the buffer or not, the chain must be serially searched and therefore, a long search time is required. In order to resolve the above problem there is assumed a search method which uses a hashing technique to restrict search items to a portion of the chain. However, it still needs a serial search and cannot sufficiently shorten the search time.

SUMMARY OF THE INVENTION

It is an object of the present invention to provide a method to control a buffer which is suitable to quickly determine whether a required data block is in the buffer.

It is another object of the present invention to provide a method for controlling a buffer which is suitable to determine at a time whether a plurality of required data blocks are in the buffer.

In accordance with the present invention, a pair of an address on an external storage and an address on a buffer area, for each of data blocks stored in the buffer area is provided, and those pairs are sorted in the order of a sequence of addresses on the external storage.

DESCRIPTION OF THE PREFERRED EMBODIMENTS

Figure 1:
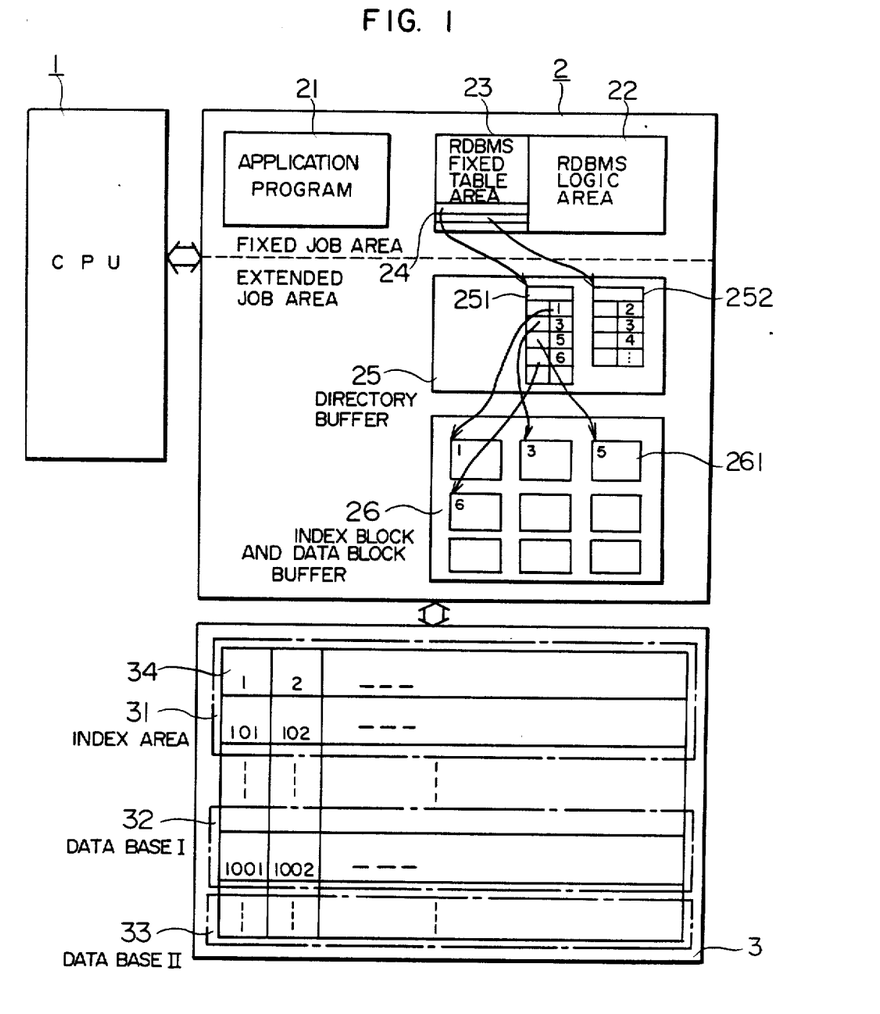
FIG. 1 shows a configuration of a data processing system having a data base system of the present invention.

FIG. 1 shows a data processing system having a relational data base. The data processing system itself and the relational data base (RDB) itself have been well known and briefly explained here.

An external storage 3 contains the relational data base. It comprises data areas 32 and 33 and index areas 31 which are utilized to access the data areas. The numbers put in the data areas are addresses assigned to data blocks 34 and they are called block numbers herein. Several data blocks are stored together. An index is provided for each of the data bases I and II and comprises a pair of retrieval keys (not shown) which are used to retrieve data, and a block number of the data block which contains the data corresponding to the keys. An application program 21 on the main storage 2 is serially fetched to the central processing unit (CPU) 1 and executed thereby. If a request to access the data base is issued during the execution, the execution is shifted to a relational data base management system (RDBMS) 22, which executes processing for accessing the required data base and deliver the result to the application program 21.

In the present embodiment, the index block numbers of the data base stored in the external storage 3 are stored in a fixed table 23, which also contains a pointer 24 to a directory in a buffer 25. The directory buffer 25 contains a directory 251 to be used to refer to the data blocks stored in a buffer 26. The directory 251 stores pairs of addresses on the main storage 2 and the block numbers, of the data blocks. It is looked up by the block number and the address corresponding to the block number is outputted. The buffer 25 further stores data used for retrieval processing to be described later.

The external storage 3 has a number of data blocks 34 each having a block number assigned there to. The index area 31 stores indices to access the data base I 32 and the data base II 33. The indices include a number of pairs of retrieval keys and block numbers for the respective data bases. The data base I 32 and data base II 33 contain data.

Figure 2A:
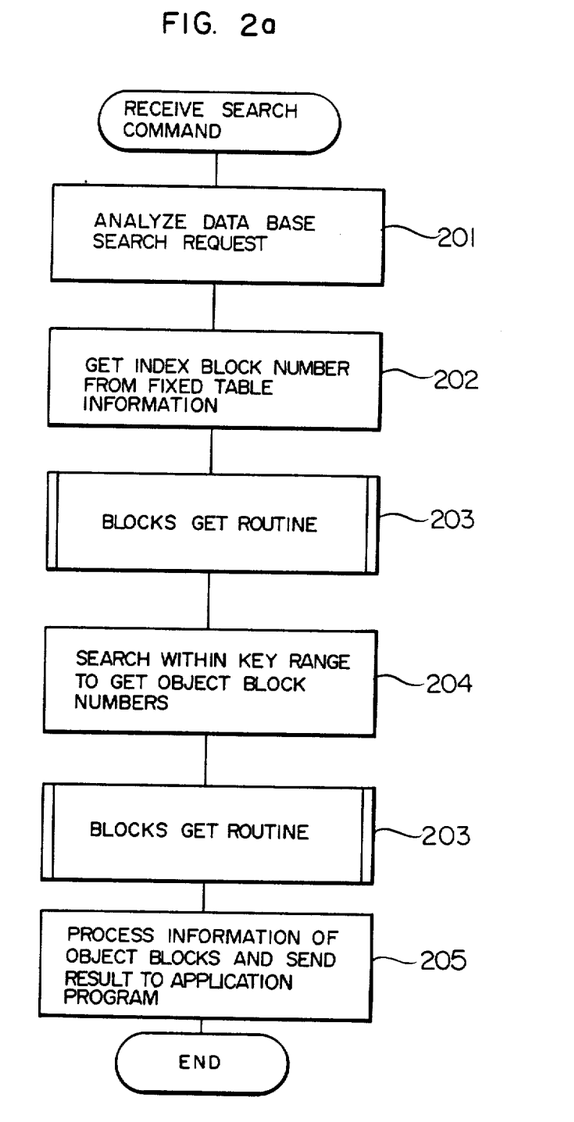
FIGS. 2a and 2b show flow charts of a portion of data base access control processing of a relational data base management system (RDBMS)
Figure 2B:
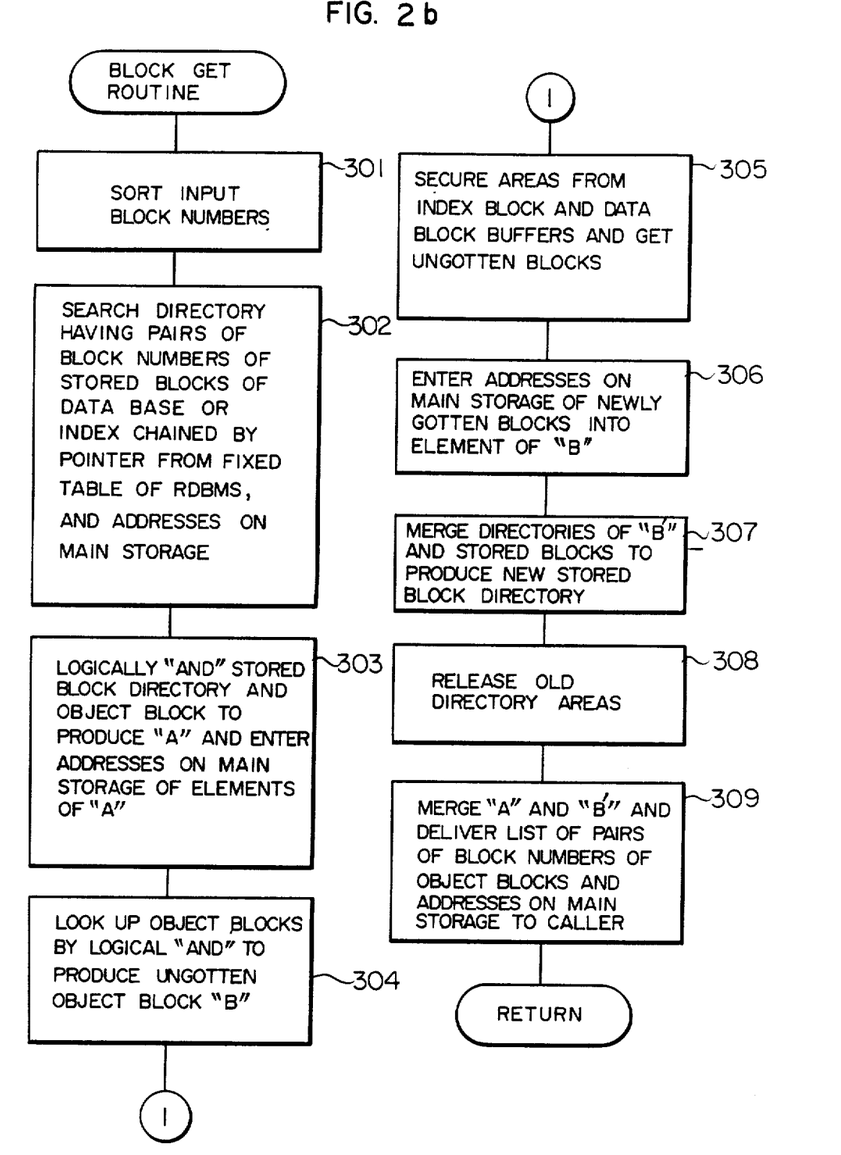

A control of the RDBMS in accordance with the present invention is explained with referernce to FIGS. 2a and 2b. Let us assume that the following data base search command is issued from the application program 21.

SELECT * FROM PERSONAL

WHERE $20 \leq YEAR \leq 25$

This is a command to select those data having search key of "YEAR" between 20 and 25 from a data base "PERSONAL". When the RDBMS 22 receives such a search command, it analyzes the command (step 201). The block number of the index stored in the fixed table area 23 is read to determine the block number of the index of the required data base (step 202). Then, the process proceeds to a blocks GET routine 203 shown in FIG. 2b. The block numbers to be fetched from the external storage 3 to the buffer 261 are stored in the buffer 25 as object block numbers 252. This is chained from the pointer 24 of the fixed table area 23 (step 301). In order to check whether those object block numbers 252 corresponds to the block numbers of the data blocks stored in the buffer 26, the directory 251 is first read (step 302). Nothing has been stored in an initial state. The block numbers of the directory 251 and the object block numbers are logically ANDed (to extract those which are present in both), and data comprising the logically ANDed block numbers sorted in the order of block number and the addresses on the main storage, of the block numbers, in the same format as the directory is prepared (step 303). It is also stored in the buffer 25 and chained from the pointer 24. This data is designated by A.

The object block numbers 252 are compared with the A and those in the object block numbers 251 which do not match to the A, that is, those whose data blocks have not yet been stored in the buffer, are extracted (step 304). It is designated by B. An area for the unstored data blocks is allocated in the buffer 25, and the data blocks are fetched from the external storage 3 in accordance with the B and they are stored in the buffer 25 (step 305). The addresses on the main storage 2 in which the data blocks of those block numbers are stored in paired relation with the block numbers of the B are written (step 306). It is designated by B'. The B' and the directly 251 for the stored blocks are merged and a resulting new directory is stored in the buffer 25 and the start address thereof is stored in the pointer 24 (step 307). In the initial state, the directory 251 contains nothing. The B' has been sorted by the block number. Accordingly, the new directory is sorted in the order of block number. In the second and subsequent processings, the directory is sorted by the block number and the B' is also similarly sorted. By merging those, a similarly sorted new directory is obtained. The old directory area is then released (step 308). The A and the B' are merged and the merged result is delivered to the processing function (caller program) which called the merge routine (step 309), and the process returns to the routine of FIG. 2a.

The indices in the buffer 26 are read in accordance with the delivered information and the block numbers of the data blocks having keys designated by the search command in a specified range are determined (step 204). The process proceeds to the blocks GET routine 203 where a similar processing is performed. When necessary data blocks have been stored in the buffer 26, information requested by the search command is edited from those blocks and the result is sent to the application program (step 205).

In the method to control the buffer described above, the block numbers and the addresses on the main storage at which the data blocks are stored are paired and stored in the directory separately from the data blocks, and the pairs in the directory are always kept sorted by the block number sequence. Accordingly, whether the required data block is in the buffer or not can be determined without serially searching the buffer, and a high speed search is attained because of sorting by the block number sequence. The search is made until a pair having a large block number than the required data block number is detected, and if there is no matching, it is determined that the required block number is not stored in the directory. Thus, no further reach is necessary.

Figure 3:
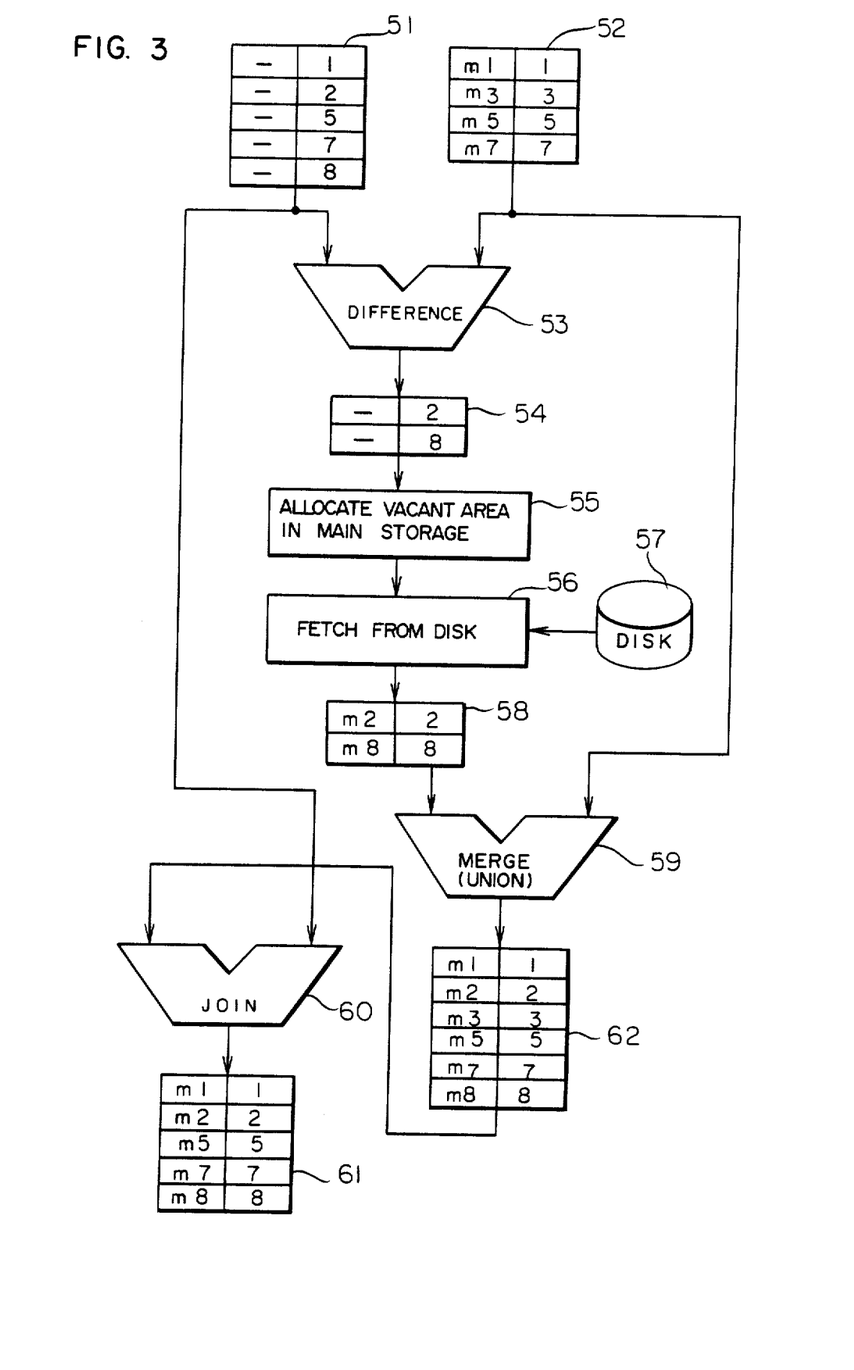
FIG. 3 shows a modification of FIG. 2b.

FIG. 3 shows another method of operation in the configuration shown in FIG. 1. Numeral 51 denotes object block numbers. Nothing is contained on the left column (areas each stores one of the pairs) and block numbers are contained in the right column, sorted by the block number sequence. Numeral 52 denotes a directory. A left column contains addresses on the main storage at which the data blocks are stored, and a right column contains the block numbers. A difference between the block numbers is calculated (53) to extract columns 54 having the block numbers 51 which do not match to the block numbers in the index 52. A vacant area in the buffer area of the main storage is allocated to the block numbers of the columns 54 (55), and the data blocks are fetched from the disk 57 and stored in the allocated area (56). The addresses on the main storage at which those data blocks have been stored are written into the left columns of 54 to prepare columns 58. The directory 52 and the columns 58 are merged 54 to prepare a new directory 62. Columns in a directory 62 which have the same block numbers as the block numbers 51 are read out (60) to prepare pairs (61) of object block numbers and addresses on the main storage at which the data blocks of those block numbers are stored.

The merge (logical OR), logical AND and difference operations of the pairs of block numbers and addresses on the main storage, performed in the above processing are explained with reference to FIGS. 4a to 6b.

Figure 4A:
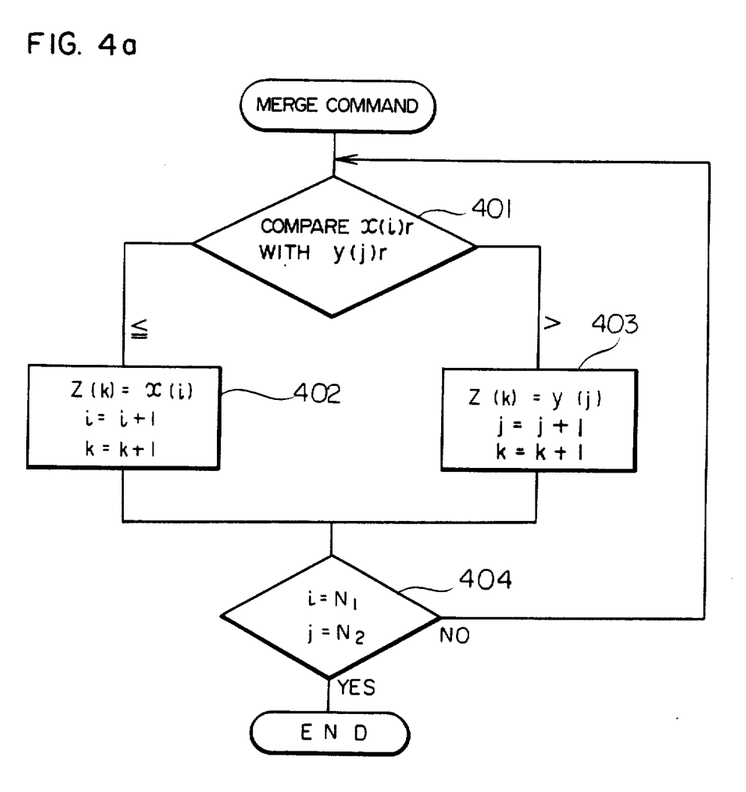
FIG. 4a shows an example of merge processing.
Figure 4B:
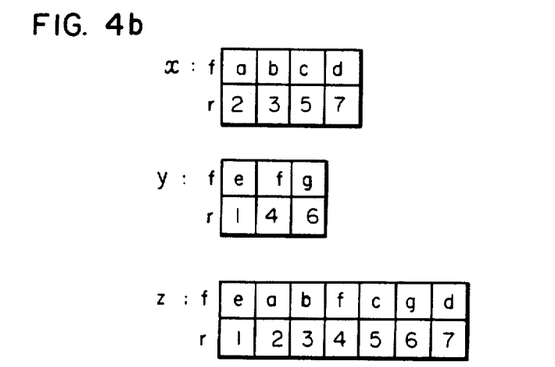
FIG. 4b shows data processed in FIG. 4a, FIG. 5a shows an example of logical AND (JOIN) processing.

FIGS. 4a and 4b illustrate merge processing. From pairs x of main storage addresses and block numbers and pairs y shown in FIG. 4b, pairs Z are prepared. The pairs are sorted by block number sequence. When a merge command is issued, r (rear) areas of first pairs of x and y are compared (401). If $x(i)r \leq y(j)r$, the content of $x(i)r$ is stored in $Z(k)$ and i and k are incremented by one, respectively (402). If $x(i)r \leq y(j)r$, the content of $y(i)$ is stored in $z(k)$ and j and k are incremented by one, respectively (403). Unless i and j reach predetermined values $N_1$ and $N_2$, respectively, the process returns to the step 401 to repeat the similar process, and if they reach, the merge process is terminated (404).

Figure 5A:
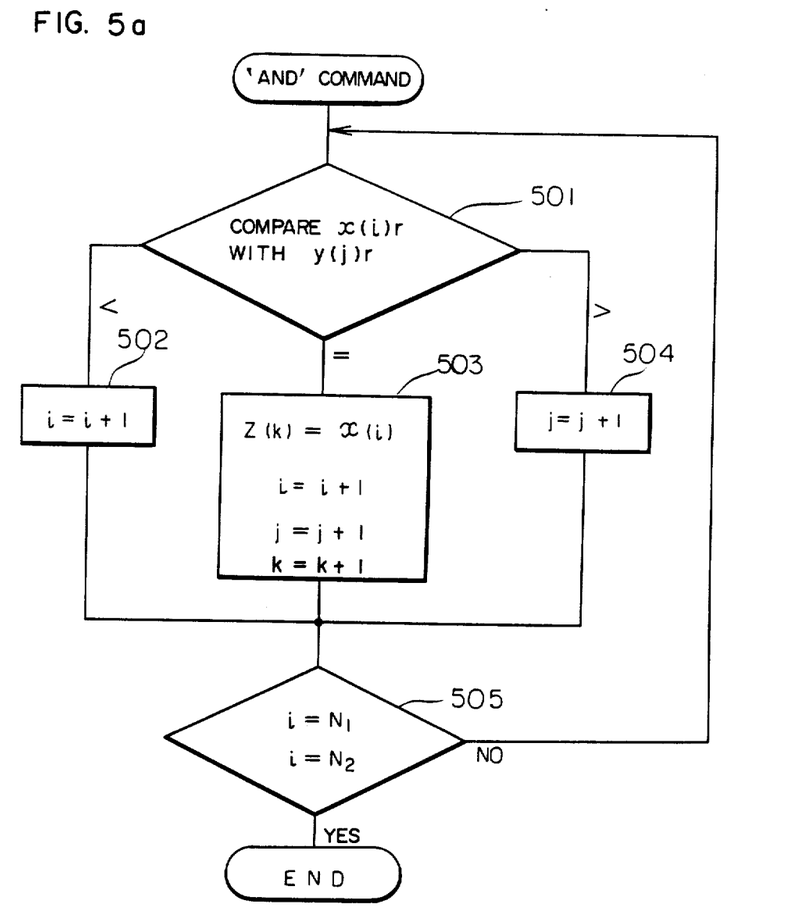
Figure 5B:
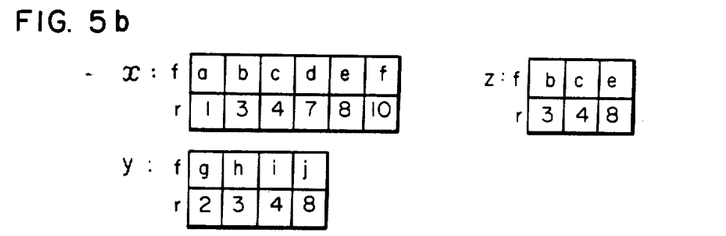
FIG. 5b shows data processed in FIG. 5a, FIG. 6a show an example of difference processing.

FIGS. 5a and 5b illustrate processing of logically ANDing x and y to produce z.

The r areas of the first pairs of x and y are compared (501). If $x(i)r < y(j)r$, i is incremented by one (502). If $x(i)r = y(j)r$, the content of $x(i)$ is stored in $z(k)$ and i, j and k are incremented by one, respectively (503). If $x(i)r > y(j)r$, j is incremented by one (504). The above process is repeated until $i = N_1$ and $j = N_2$ is reached (505). As a result, those pairs having the same r areas in x and y are extracted to provide the data z.

Figure 6A:
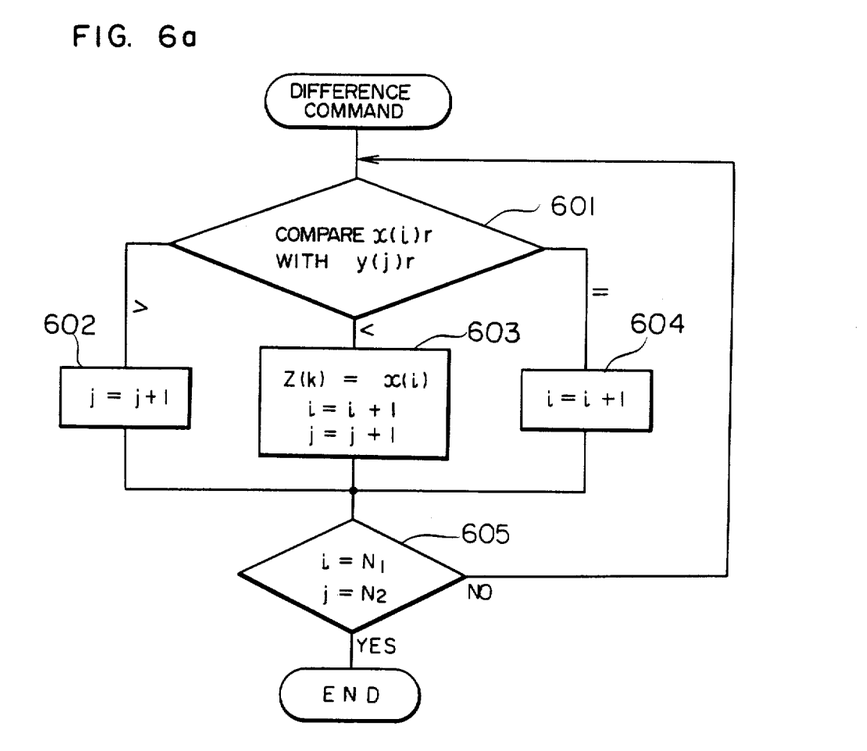
Figure 6B:
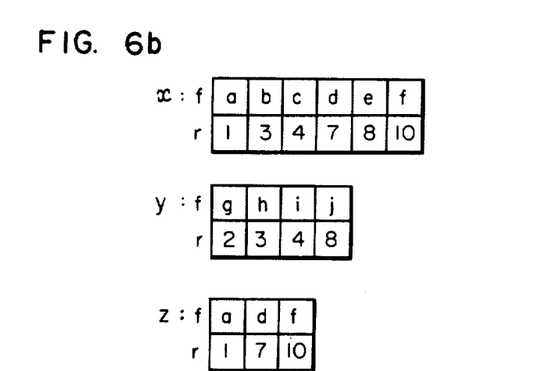
FIG. 6b shows data processed in FIG. 6a, FIG. 7 is a block diagram of a vector processor.

FIGS. 6a and 6b illustrate difference processing. The r areas of the first pairs of x and y are compared (601). If x(i)r>y(j)r, j is incremented by one (602). If x(i)r<y(j)r, the content of x(i) is stored in z(k), and i and j are incremented by one, respectively (603). If x(i)r =y(j)r, i is incremented by one (604). The above process is repeated until $i=N_1$, $j=N_2$ is reached (605) to produce the data Z which includes those pairs in x which are not present in y.

Since the pairs have been sorted by the data block number, the operations can be performed by repetition of simple operations.

Because the elements of the two inputs are arranged in the ascending order, the above operations may be performed by a vector processor. General description of vector operation is found in U.S. Pat. No. 4,128,880 and "Compiling Algorithms and Techniques for the S-810 Vector Processor", IEEE 1984 International Conference on Parallel Processing, pages 285-290.

It is assumed in the present embodiment that the directory or the object block number group is handled as one vector data, each column is a vector element and left and right portions of a column can be independently read and written. Such a vector is called a dual vector. The vector operation cannot be performed by a prior art vector processor because the vector element to be referenced or stored in each operation cycle changes for every three vectors (two input vectors and one result vector) depending on comparison with past elements. The prior art vector processor which allows only the operation between the elements of the corresponding order cannot rapidly perform the difference operation. It cannot also rapidly perform the merge (union) and logical AND (join) operations.

Figure 7:
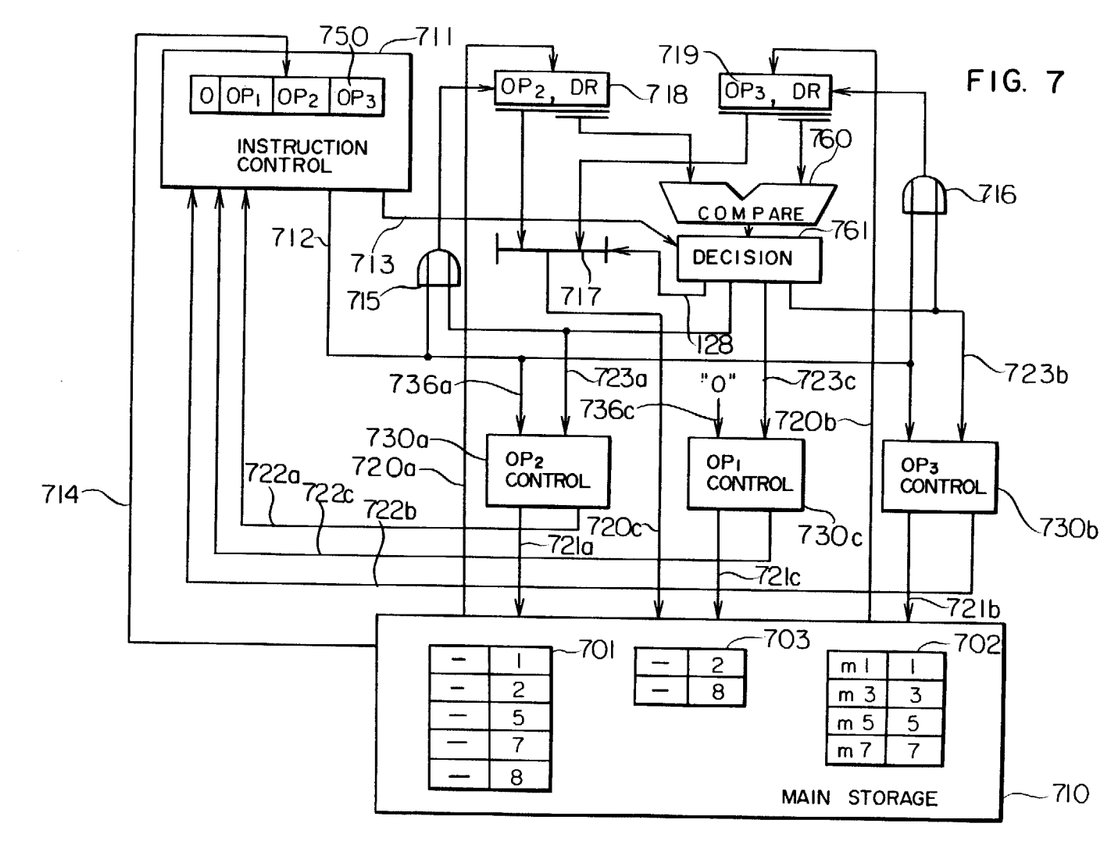

FIG. 7 shows a block diagram of a vector processor which performs the difference, merge and logical AND operations to the dual vectors. When it receives a vector instruction 750, it performs the same operations as those shown in FIGS. 4a-6b. The vector instruction has a field C which indicates a type f command (difference, merge or logical AND), OP1 which indicates a result vector Z, OP2 which indicates an input vector y and OP3 which indicates an input vector X.

Vector data 701, 702 and 703 are stored at predetermined locations on a main storage 710.

An instruction control circuit 711 includes an instruction word register 750 and controls start and end of the vector instruction. A second operand control circuit 730a, a third operand control circuit 730b and a first operand control circuit 730c generate addresses of elements of the respective operands. The three control circuits 730a, 730b and 730c may be of the same configuration as shown in FIG. 8.

A second operand data register 718 and a third operand data register 719 are used to hold the operand elements sequentially read from the main storage 710 for more than one cycle. A comparator 760 compares rear halves of the second operand data register 718 and the third operand data register 719 and supplies an output to a decision circuit 761 which also receives a signal 713 indicating a type of operation from the instruction control circuit 711. The decision circuit 761 generates a signal 728 which instructs to a selector 717 to select one of the contents of the second operand data register 718 and the third operand data register 719 and transfer it to the main storage, and three signals 723a, 723b and 723c which instruct to the operands to update the addresses, read out the next operands and store the output of the selector. Gates 715 and 716 are OR gates which receive a signal from the instruction control circuit 711 and a signal from the decision circuit 761 and supplies the next operand read address update signals to the second operand data register 718 and the third operand data register 719. In this manner, the selector 717 selects mismatching operand elements 2 and 8 of the dual vector 1 and the dual vector 2 and supplies them to the main storage 710. Thus, a dual vector 3 is generated. While the difference operation is illustrated in the present embodiment, merge (union) operation and logical "AND" (join) operation can be similarly performed.

Figure 8:
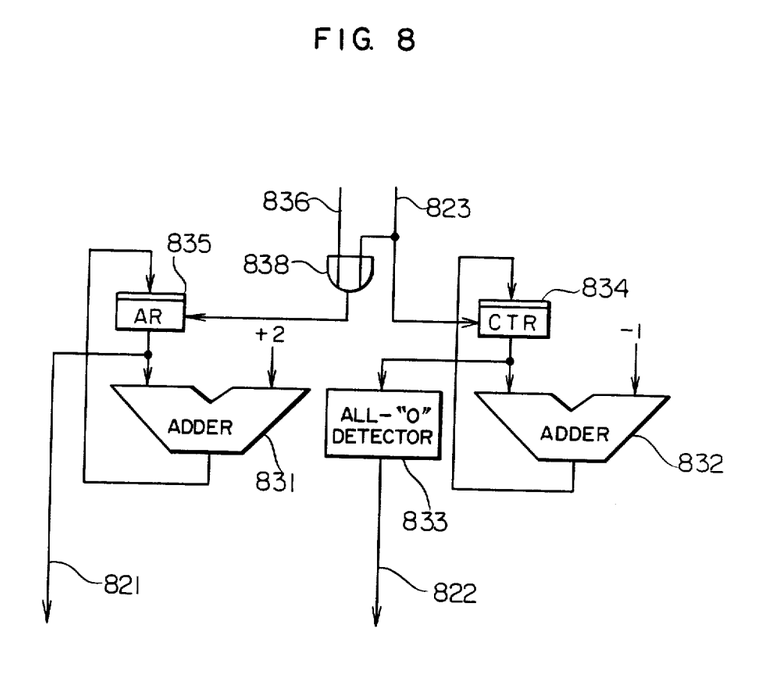
FIG. 8 shows a configuration of an operand controller.

FIG. 8 shows a detailed block diagram of the three operand control circuits of FIG. 7. The three operand control circuits 830a, 830b and 830c are of the same configuration and each comprises address 831 and 832, an address register 835, an operand counter 834, an all-zero ("0") detector 833 and an OR gate 838.

For the second and third operand control circuits 830a and 830b, the signal from the instruction control circuit 811 is supplied to a line 836, and for the first operand control circuit 830c, a "0" input is supplied to the line 836. An address to the main storage 710 and an end signal to the instruction control circuit 711 are supplied to lines 821 and 822, respectively.

The address register 835 stores the vector operand element address and the content thereof is supplied to the main storage 710 through an address line 821. In the present embodiment, one vector element comprises two words, front half and rear half, and the adder 831 having a +2 input is used to calculate the next element address. The address register is updated when the start trigger signal 836 or the address update signal 823 applied to the OR gate 838 is "1", and the content thereof is sent to the main storage 710 through the line 821.

The operand counter 834 stores the number of remaining vector operand elements, and the zero detector 833 sends the end signal 822 to the instruction control circuit 711 in a cycle when the number of remaining elements is zero. The adder 832 having a −1 input is used to decrement the number of remaining elements. When the address update signal 823 is "1", the operand counter 834 is updated.

Figure 9:
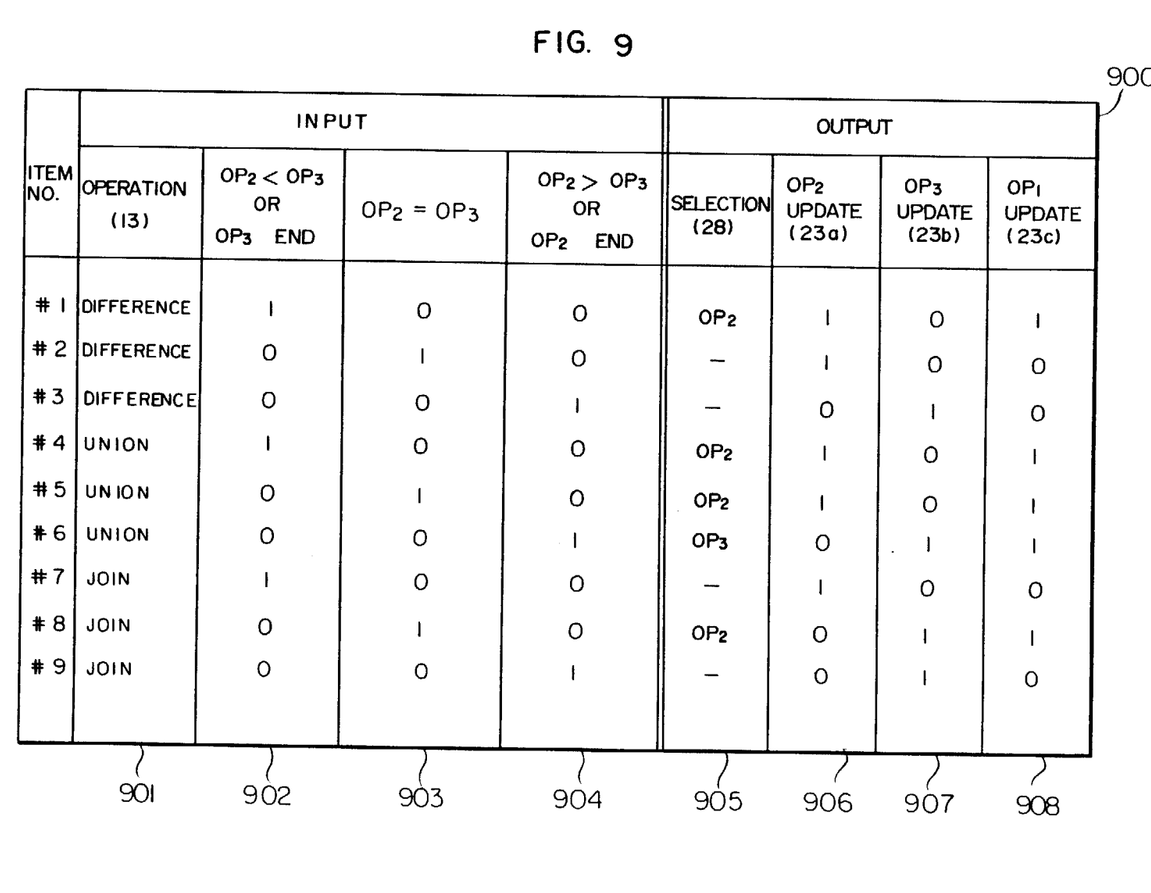
FIG. 9 shows a truth table of a discriminator.

FIG. 9 shows a truth table of the decision circuit of FIG. 7. A left side of the truth table 900 shows input conditions and a right side shows output values. Each line shows one input condition and a corresponding output value. Columns 901-904 of the table indicate input conditions and columns 905-908 indicate outputs.

The column 901 represents a signal indicating the type of operation supplied from the instruction control circuit 711 of FIG. 7 through the signal line 713. In the present embodiment, there are three types of operation, difference, union and join. The columns 902, 903 and 904 represent the signals supplied from the comparator 760 and they indicate the comparison result of the rear halves of the second operand data register (OP2) and the third operand data register (OP3), that is, the former is smaller than, equal to or larger than the latter. As an exception, when the vector operand elements of one operand have been exhausted, the exhausted side is regarded to be larger. Whether the vector operand elements have been exhausted or not may be determined by the output signals 722a and 722b of the zero detector 733 of the operand counter in the operand control circuits 730a and 730b, although it is not shown in FIG. 7.

For example, when the column 902 is "1", it indicates that the rear half of the second operand data register (OP2) is smaller than the rear half of the third operand data register (OP3) or the vector elements of the third operand data register (OP3) have been exhausted. When the column 903 or 904 is "1", it indicates that the second operand data register (OP2) and the third operand data register (OP3) are equal, and the second operand data register (OP2) is larger than the third operand data register (OP3) or the vector elements of the second operand data register have been exhausted.

The column 905 represents the output of the control line 728 to control the selector 717 of FIG. 7. A symbol "—" indicates that the output of the selector 717 is not transferred to or stored in the main storage 710 under this input condition. "OP2" and "OP3" indicate that signals to select the second operand data register (OP2) and the third operand data register (OP3), respectively, are outputted. The columns 906, 707 and 908 represent the outputs of the three signals lines 723a, 723b and 723c which instruct to update the element address for each operand and read out the operand from the main storage or store the output of the selector. For example, when the column 906 is "1", it indicates updating of the address register 835 of FIG. 8, updating of the operand counter 834 and updating of the second operand data register (OP2) of FIG. 7.

Figure 10:
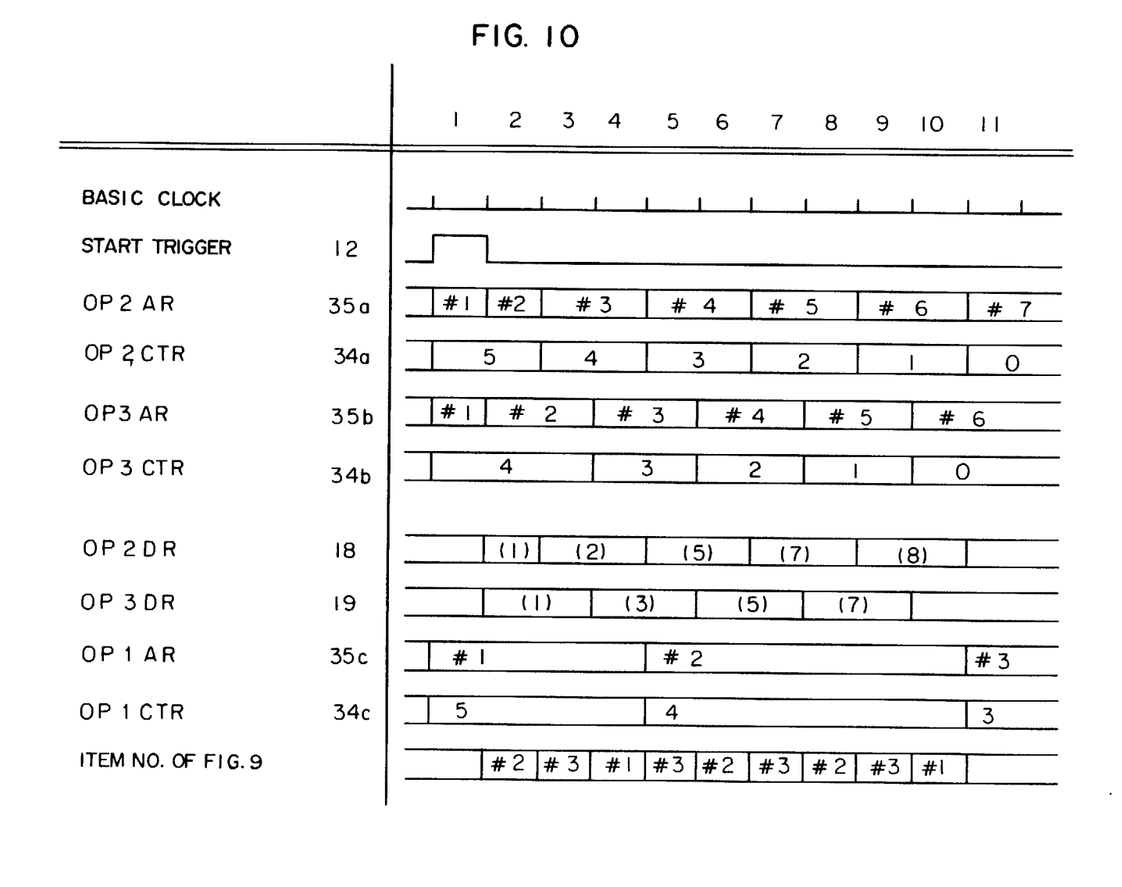
FIG. 10 shows an operation time chart of the vector processor shown in FIG. 7.

FIG. 10 shows an operation time chart in FIG. 7. Referring to FIGS. 10 and 7, the operation of the difference instruction for the difference operation of FIG. 8 is explained.

The dual vectors 1, 2 and 3 and instruction words are stored in the main storage 710. The instruction words include at least difference, union and join, which are fetched from the main storage 710 under the control of the instruction control circuit 711 and stored in the instruction word register 750 through the data line 714.

The instruction word in the instruction word register 750 consists of four fields. A leftmost field O is used to indicate the type of operation of the instruction (for example, difference instruction) and the content thereof is transferred to the decision circuit 761 through the signal line 713. Next three fields OP1, OP2 and OP3 are used to store pairs of the start element addresses on the main storage of the first, second and third operands, respectively, and the numbers of elements. While not shown in FIG. 7, prior to the readout or storing of the operand vector elements from or its the main storage, the instruction control circuit 711 initially sets the content thereof into the address register 835 and the operand counter 834 in the operand control circuits 730a, 730b and 730c shown in FIG. 8, and instructs to the main storage to read out the first element.

The vector processor of FIG. 7 is of one-cycle pitch pipe line configuration having two stages for the vector operation. In the first stage, the elements of the dual vectors 1 and 2 are fetched from the main storage 710 in accordance with the instruction of the address register 835a or 835b and they are transferred to the second operand data register (OP2) 718 or the third operand data register (OP3) 719. In the second stage, the contents of the second operand data register (OP2) 718 and the third operand data register (OP3) 719 are compared, one of them is selected in accordance with the compare result, and it is stored in the main storage 710 as the dual vector 703. Each register is updated in synchronism with the start of the cycle, and the main storage 710 is read in synchronism with the cycle and updated in one cycle.

In FIG. 10, changes of contents of major registers and decision item numbers of the decision circuit 761 corresponding to FIG. 9 are shown for each cycle. While not shown in FIG. 7, each register stores data in synchronism with a basic clock of one cycle pitch.

The instruction control circuit 711 sends a one-cycle start trigger signal for the first cycle to the signal line 712 following to the initialization of the address registers 835a, 835b and 835c and the operand counters 834a, 834b and 834c. At the start of the second cycle, the contents of the start elements, that is, (-, 1) and ($m_1$, 1) transferred from the main storage 710 to the data lines 720a and 720b are stored in the second operand data register (OP2) 718 and the third operand data register (OP3) 719, respectively, where (a, b) indicates that the front half of the content of the element is "a" and the rear half is "b". The second element address is stored in the address registers 835a and 835b of FIG. 8, the readout of the second element is instructed and the operand counters 834a and 834b maintain "5" and "4", respectively.

In the second cycle, since the rear halves of the second operand data register (OP2) 718 and the third operand data register (OP3) 719 are "1", the decision circuit 761 detects that the input condition of the item number 2 of FIG. 2 has been met and renders only the signal line 723a to "1" to instruct updating of only the second operand at the start of the next third cycle. It does not instruct the storing into the main storage 710.

At the start of the third cycle, only the register for the second operand is updated by the instruction from the signal line 723a. The second operand data register (OP2) 718 is updated to the content (-, 2) of the second element by the control signal from the OR gate 715, the content of the address register 835a of FIG. 8 is updated to the third element address to read out the third element, and the operand counter 834a is decremented to "4".

In the third cycle, since the condition of the item number 3 of FIG. 9 is met, the decision circuit 761 renders only the signal line 723b to "1" to instruct the updating of only the third operand. The storing into the main storage 710 is not instructed in this cycle.

At the start of the fourth cycle, only the register for the third operand is updated by the instruction from the signal line 723b. By the control signal from the OR gate 716, the third operand data register (OP3) 719 is updated to the content ($m_3$, 3) of the second element from the main storage 710 in the second cycle, the address register 835b of FIG. 8 is updated to the third element address, and the operand counter 834b is decremented to "3".

In the fourth cycle, the rear halves of (-, 2) and ($m_3$, 3) are compared and the condition of the item number 1 of FIG. 9 is met. Accordingly, the selector 717 selects the content of the second operand data register (OP2) 718 and transfers it to the main storage 710 as a write data. The (-, 2) is written into the first element of the dual vector 3 in the main storage 710. The updating of the registers for the first and second operands is instructed by the signal lines 723c and 723a.

In the fifth cycle, (-, 5) and ($m_3$, 3) are compared, and since the condition f the item number 3 of FIG. 9 is met, the register for the third operand is updated.

In the sixth cycle, (−, 5) and ($m_5$, 5) are compared, and since the condition of the item number 2 of FIG. 9 is met, the register for the second operand is updated.

In the seventh cycle, (−, 7) and ($m_5$, 5) are compared, and since the condition of the item number 3 of FIG. 9 is met, the register for the third operand is updated.

In the eighth cycle, (−, 7) and ($m_7$, 7) are compared, and since the condition of the item number 2 of FIG. 9 is met, the register for the second operand is updated.

In the ninth cycle, (−, 8) and ($m_7$, 7) are compared, and since the condition of the item number 3 is met, the register for the third operand is updated.

In the tenth cycle, the content of the second operand data register (OP2) 718 is (−, 8) and the elements of the third operand data register (OP3) 719 have been exhausted. Accordingly, the condition of the item number 1 of FIG. 9 is met and the content of the second operand data register (OP2) 718 is written as the second element of the dual vector 3 in the main storage 710.

In the eleventh cycle, the fact that all elements of the second operand vector have been read, that is, exhausted is reported to the instruction control circuit 711 through the signal line 722a, and the execution of the instruction is terminated.

In this manner, the difference instruction can be executed in a number of cycles which is approximately equal to a sum of the numbers of elements of the second operand and the third operand, because one-cycle pitch comparison is carried out continuously by the pipeline.

The union instruction and join instruction can be similarly executed in accordance with the truth table of FIG. 9, although the end condition of the instruction is somewhat different. The end condition for the difference instruction is that the signal line 722a is "1" or the signal line 722c is "1", that is, the second operand is completed or the first operand is full.

The end condition for the union instruction is that the signal lines 722a and 722b are "1" or the signal line 722c is "1", that is, the first operand is full.

The end condition for the join instruction is that at least one of the signal lines 722a and 722b is "1" or the signal line 722c is "1", that is, at least one of second and third operands is completed or the first operand is full.

The execution time for the union instruction or join instruction is also approximately equal to the number of cycles equal to the sam of the numbers of elements of the second operand and the third operand.

In the present embodiment, the dual vectors are stored in the main storage 710, although they may be stored in other storage such as vector registers.

In the dual vector shown in FIG. 3, more than one element having the same data block number or duplicate number is not used. In the present embodiment, n duplicate elements can be exactly outputted for the join instruction even if there are n duplicate elements which meet the condition in the left hand vector (second operand and vector).

For the difference instruction and union instruction, duplicate elements may be included in the left and right vectors.

In the present embodiment, the execution of the difference, union or join instruction needs only one cycle of operation time per input element. If it is executed by a conventional non-vector instruction (scalar instruction), at least five instructions and five cycles are required for each element for operand readout, comparison, operand address updating and decision of end condition. Accordingly, the present invention improves the operation speed by a factor of at least five and can be applied to the operation between vector elements having different element numbers for each of difference, union and join operands. In FIG. 3, if the number of output elements of the difference operation is small, the address translation can be performed in $(x+y)*2$ cycles, where x is the number of data blocks to be address-translated and y is the number of data blocks stored in the main storage 710.

When sorting by the data block number sequence is required for the address translation, a known algorithm, such as a merge/sort method which requires an execution time proportional to x log x may be used. The union instruction of the present embodiment can be applied to the merging in the merge/sort method.

In the present embodiment, the vector processor of FIG. 7 is selectively used to execute the union instruction, difference instruction or join instruction by the instruction word. If separate vector processors are provided and parallelly operated, higher speed operation is attained.

In the vector processor of the present invention, the vector operation is performed by the merge process by the one-cycle pitch pipeline, and high speed address translation proportional to the number of data blocks is attained for a number of data block address translation requests and a number of read data blocks.

We claim:

1. A method for controlling a buffer in a data processing system having a central processing unit (CPU), a main storage and a first storage wherein said first storage stores a plurality of data blocks, each data block having a plurality of recordings which are processed in a read or write operation of said CPU and said main storage stores location information indicating locations at which said data blocks are stored in said first storage, said buffer being provided in said main storage and coupled to a vector processor for buffering data blocks fetched from said first storage to said main storage for processing, said method comprising the steps of:

fetching desired data blocks from said first storage and storing said desired data blocks in said main storage;

providing a directory for data blocks stored in said main storage, said directory having pairs of an address of said main storage at which a data block is stored and location information indicating a location of said first storage at which said data block is stored; and vectorially arranging said pairs of address and location information in said directory in a portion of said main memory in orders of magnitude of values of said location information, to enable rapid determination of whether said desired data block is in said buffer.

2. A method for controlling a buffer according to claim 1, wherein said step for providing a directory includes the steps of:

obtaining a group of location information of data blocks to be processed and sorting said group of location information in orders of magnitude of values of location information within said group of location information to produce a first group of location information;

comparing said first group of location information to location information of said directory and extracting pairs of address and location information having location information corresponding to said location information of said first group of location information to generate a first group of pairs of address and location information;

extracting location information not contained in said first group of pairs of address and location information from said first group of location information to produce a second group of location information;

generating a second group of pairs of address and location information in said main storage of data blocks designated by the second group of location information;

merging said directory with said second group of pairs of address and location information to produce a new directory; and said step for fetching and storing said desired data blocks in said main storage fetches said data blocks designated by said second group of location information from said first storage and stores said data blocks designated by said second group of location information in said main storage.

3. A method for controlling a buffer according to claim 1, wherein said step for providing a directory includes the steps of:

obtaining location information of data blocks to be processed and sorting said location information by orders of magnitude of values of said location information to produce a first group of location information;

comparing said first group of location information to location information of said directory and extracting location information not contained in said directory from said first group of location information to produce a second group of location information;

generating a second group of pairs of address and location information in said main storage of data blocks designated by said second group of location information;

merging said directory with said second group of pairs of address and location information to produce a new directory;

wherein said step for fetching and storing said desired data blocks insaid main storage fetches said data blocks designated by said second group of location information from said first stroage and stores said data blocks designated by said second group of location information in said main storage.

4. A method for controlling a buffer according to claim 2, wherein said step of obtaining a group of location information includes the steps of:

comparing location information of a first pair of address and location information in said directory to first location information of said first group of location information, and comparing location information of a designated pair of address and location information in said directory to designated location information of said first group of location information;

selecting a succeeding pair of address and location information in said directory to be compared in said comparing step if said location information of said first pair of address and location information is smaller than said first location information of said first group of location information;

selecting succeeding location information of said first group of location information to be compared in said comparing step if said location information of said first pair of address and location information is larger than said first location information of said first group of location information;

selecting said first pair of address and location information of said directory if said location information of said first pair of address and location information is equal to said first location information of said first group of location information; and repeating the above steps until each pair of address and location information of said directory and each location information of said first group of location information are compared and appropriately selected in accordance with the above steps.

5. A method for controlling a buffer according to claim 2, wherein said step of extracting location information includes the steps of:

comparing first location information of said first group of location information to location information of a first pair of address and location information of said first group of pairs of address and location information and comparing designated location information of said first group of location information to location information of a designated pair of address and location information of said first group of pairs of address and location information;

selecting a succeeding pair of said first group of pairs of address and location information to be compared in said comparing steps if said first location information of said first group of location information is larger than said location information of said first pair of address and location information;

selecting succeeding location information of said first group of location information to be compared in said comparing step if said first location information of said first group of location information is equal to said location information of said first pair of address and location information of said first group of pairs of address and location information;

extracting said first location information of said first group of location information if said location information of the first group of location information is larger than said location information of said first pair of address and location information of said first group of pairs of address and location information; and repeating the above steps until each location information of said first group of location information and each pair of address and location information of said first group of pairs of address and location information are compared and appropriately selected in accordance with the above steps.

6. A method for controlling a buffer according to claim 2, wherein said step of merging said directory includes the steps of:

comparing location information of said first pair of address and location information of said directory to location information of a first pair of address and location information of said second group of pairs of address and location information and comparing location information of a selected pair of address and location information of said directory to location information of a selected pair of address and location information of said second group of pairs of address and location information;

extracting said first pair of address and location information of said directory if said location information of said first pair of address and location information of said directory is smaller than or equal to location information of a first pair of address and location information of said second group of pairs of address and location information, and selecting a succeeding pair of address and location information of said directory;

selecting said first pair of address and location information of said second group of pairs of address and location information if said location information of said first pair of address and location information of said directory is larger than said location information of said first pair of address and location information of said second group of pairs of address and location information and selecting a succeeding pair of address and location information of said second group of pairs of address and location information; and repeating the above steps until each pair of address and location information of said directory and each pair of address and location information of said second group of pairs of address and location information are compared and appropriately extracted or selected in accordance with the above steps.

7. A method for controlling a buffer according to claim 3, wherein said step of generating a second group of pairs of address and location information includes the steps of:

comparing first location information of said first group of location information to location information of a first pair of address and location information of said directory and comparing a selected location information of said first group of location information to location information of a selected pair of address and location information of said directory;

selecting a succeeding pair of address and location information of said directory to be compared in said comparing step if said location information of said first group of location information is larger than said location information of said first pair of address and location information of said directory;

selecting a succeeding location information of said first group of location information to be compared in said comparing step if said location information of said first group of location information is equal to said location information of said first pair of address and location information of said directory;

extracting said location information of said first group of location information if said location information of said first pair of address and location information of said directory is larger than said location information of said first group of location information; and repeating the above steps until each location information of said first group of location information and each pair of address and location information of said directory are compared and appropriately selected or extracted in accordance with the above steps.

8. A method for controlling a buffer according to claim 3, wherein said step of merging said directory includes the steps of:

comparing location information of said first pair of address and location information of said directory to location information of a first pair of address and location information of said second group of pairs of address and location information and comparing location information of a selected pair of address and location information of said directory to location information of a selected pair of address and location information of said second group of pairs of address and location information;

extracting said first pair of address and location information of said directory and selecting a succeeding pair of address and location information of said directory if said location information of said first pair of address and location information of said directory is smaller than said location information of said first pair of address and location information of said second group of pairs of address and location information or if said location information of said first pair of address and location information of said directory and said location information of said first pair of address and location information of said second group of pairs of address and location information are equal;

selecting said first pair of address and location information of said second group of pairs of address and location information and a succeeding pair of address and location information of said second group of pairs of address and location information if said location information of said first pair of address and location information of said directory is larger than said location information of said first pair of address and location information of said second group of pairs of address and location information; and repeating the above steps until each pair of address and location information of said directory and each pair of address and location information of said second group of pairs of address and location information are compared and appropriately extracted or selected in accordance with the above steps.

* * * * *